(12) United States Patent
Isenhour et al.

(10) Patent No.: US 9,172,178 B2
(45) Date of Patent: Oct. 27, 2015

(54) MAGNETIC COUPLING WITH LOW MOMENT ARTICULATED PLUG

(71) Applicant: Corning Cable Systems LLC, Hickory, NC (US)

(72) Inventors: Micah Colen Isenhour, Lincolnton, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 62 days.

(21) Appl. No.: 14/056,150

(22) Filed: Oct. 17, 2013

(65) Prior Publication Data

US 2015/0111398 A1    Apr. 23, 2015

(51) Int. Cl.
*H01R 11/30*     (2006.01)
*H01R 13/62*     (2006.01)

(52) U.S. Cl.
CPC .................................. *H01R 13/6205* (2013.01)

(58) Field of Classification Search
CPC .. H01R 13/6205; H01R 13/562; H01R 43/24; G02B 6/3886
USPC ................. 439/38–40, 447, 604, 606; 385/57
See application file for complete search history.

(56) References Cited

U.S. PATENT DOCUMENTS

| | | | | |
|---|---|---|---|---|
| 3,522,578 | A * | 8/1970 | Newman | 439/447 |
| 3,528,051 | A * | 9/1970 | Cooper et al. | 439/447 |
| 6,171,147 | B1 * | 1/2001 | Nachbauer et al. | 439/604 |
| 6,623,275 | B1 * | 9/2003 | Pavlovic et al. | 439/38 |
| 6,843,683 | B2 * | 1/2005 | Cheng | 439/606 |
| 7,018,231 | B2 * | 3/2006 | Liu et al. | 439/492 |
| 7,445,452 | B1 * | 11/2008 | Wu | 439/39 |
| 7,497,693 | B1 * | 3/2009 | Wu | 439/39 |
| 7,566,224 | B2 * | 7/2009 | Wu | 439/39 |
| 7,641,399 | B2 | 1/2010 | Loch et al. | 385/92 |
| 7,963,773 | B2 * | 6/2011 | Palli et al. | 439/38 |
| 8,460,008 | B1 * | 6/2013 | Lin et al. | 439/39 |
| 8,790,120 | B2 * | 7/2014 | Wang et al. | 439/39 |
| 8,894,420 | B2 * | 11/2014 | Schichl et al. | 439/39 |
| 2010/0202736 | A1 | 8/2010 | Roth | 385/59 |
| 2012/0224386 | A1 | 9/2012 | DeWitt | 362/551 |

* cited by examiner

*Primary Examiner* — Thanh Tam Le (57) ABSTRACT

A plug for connecting to an electronic device includes a housing having an aperture, a magnetic element positioned in the aperture and having a second aperture, at least one contact within the aperture and the second aperture, a cord connected to the housing, and a mechanism configured to reduce a moment arm on the housing when a force is applied to the cord. The plug may be used as part of a connection that further includes a receptacle having a magnetic element with a recess, wherein the recess comprises an aperture, and at least one contact extending through the third aperture and into the recess.

27 Claims, 11 Drawing Sheets

MAGNETIC COUPLING WITH LOW MOMENT ARTICULATED PLUG

BACKGROUND

1. Field of the Disclosure

The present disclosure generally relates to optical communication and, more particularly, to providing power and/or optical communication to an electronic device using a connector such as a plug having a magnetic connection that may be part of a connector system having a complimentary receptacle for the plug.

2. Technical Background

Conventional data and/or power connections comprise female connectors and male connectors. The male connector generally includes a cable that transmits a data signal or power, and the female connector is generally included in an electronic device. The mating of the male and female connectors provides a stable connection between the cable and the components that allows reliable data and/or power transfer across the cable and to the electronic device. Typical male and female connectors may include a mechanical interlock such as metal shells, pins or the like for securing the connection.

However, using this type of connection, damage may occur to the male connector, the female connector, and/or the electronic device in a number of ways especially in consumer applications. For example, force applied to the cable can cause the male connector and the female connector to be demated at an angle that bends the male connector and/or damages the female connector such that accurate mating is no longer possible. In another example, if force is applied to the cable and the male connector and female connector do not demate, the electronic device may be pulled so that it falls from a surface on which it was sitting, thereby causing damage to the electronic device. Moreover, consumer applications are expected to handle a relatively large number of mating cycles.

Further, electronic devices such as tablets, laptops, smart phones and the like are moving toward high-speed connections for transferring data and are considering optical transmission media in addition to, or to replace the copper transmission media. Benefits of optical fiber include extremely wide bandwidth and low noise operation. Optical cable assemblies may be utilized in consumer electronics applications to transfer data between electronic devices. However, a precise connection between optical fibers in, for example, a cable assembly and an electronic device must be provided to ensure uninterrupted transfer of data.

Accordingly, a need exists for a connector that provides a precise connection between communication media such as optical fibers in the cable and the electronic device, but that also may be demated without causing damage to the connector or the electronic device while still providing a robust and reliable connection for a relatively large number of mating cycles.

SUMMARY

In embodiments, a plug for connecting to an electronic device is disclosed. The plug may comprise a housing having a first surface, a first aperture in the first surface, and a second surface; a magnetic element positioned in the first aperture and having a second aperture; at least one contact within the first aperture and the second aperture; a cord connected to the second surface of the housing; and a mechanism configured to reduce a moment arm on the housing when a force is applied to the cord.

In embodiments a connection for connecting one or more electronic devices is disclosed. The connection may comprise a plug comprising a housing having a first surface and an first aperture in the first surface, a first magnetic element positioned in the first aperture and having a second aperture, at least one plug contact within the first aperture and the second aperture, a cord connected to a second surface of the housing, and a mechanism configured to reduce a moment arm on the housing when a force is applied to the cord. According to other embodiments, the connection may also comprise a complimentary receptacle for connection with the plug. The receptacle comprises a second magnetic element having a recess, wherein the recess comprises a third aperture, at least one receptacle contact extending through the third aperture and into the recess, wherein the first magnetic element and the second magnetic element are configured to be mated to one another.

In further embodiments, the mechanism configured to reduce a moment arm on the housing when a force is applied to the cord may be a recess in the second surface configured so that an intersection between the cord and the second surface is displaced toward the first surface relative to a non-recessed portion of the second surface.

In still other embodiments, the mechanism configured to reduce a moment arm on the housing when a force is applied to the cord may be an overmolded section positioned between the cord and the housing, and wherein the overmolded section is more flexible than the cord.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more explanatory embodiment(s), and together with the description serve to explain principles and operation of the various embodiments.

DETAILED DESCRIPTION

Reference will now be made in detail to the embodiments of the disclosure, examples of which are illustrated in the accompanying drawings. Whenever possible, like reference numbers will be used to refer to like components or parts.

Figure 1:
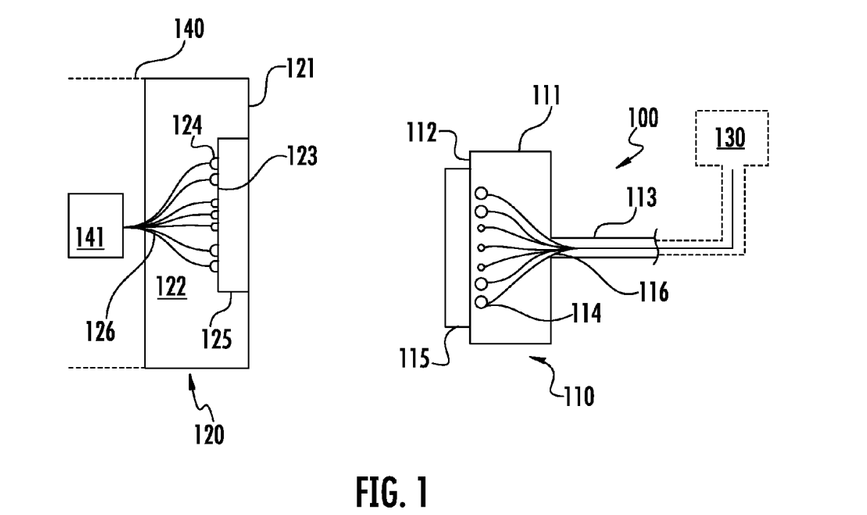
FIG. 1 schematically depicts a cross-sectional view of a connector and receptacle according to one or more embodiments described and illustrated herein.

Referring to FIG. 1, an embodiment of a connector 100 according to the present disclosure is illustrated in a cross-sectional view. The magnetic connector 100 includes a first connector or plug 110 (hereinafter referred to as the "plug") and a second connector or receptacle 120 (hereinafter referred to as the "receptacle"). In embodiments, the plug 110 may be connected to an electronic device or electrical relation 130, and the receptacle 120 may be embedded within a second electronic device 140. In embodiments, the first electronic device 130 may comprise a transformer and/or a data transmitter, and the second device 140 may be a laptop computer, a tablet computer, a cellular phone, display, or a hand-held electronic device having a housing 121 and internal electronics 141.

The plug 110 may include a plug body 111 having a face 112 and the plug 110 may be connected to a cable 113. In embodiments, the body 111 may be composed of a conventional non-conductive material. In the embodiment shown in FIG. 1, a plurality of contacts 114 and a magnetic element 115 may be positioned on or within the plug body 111. The contacts 114 may be electrically and/or optically connected to the electronic device 130 via the wires 116, wherein the wires may run through a cable 113 that is physically connected between the plug 110 and the electronic device 130. As used herein, "wires" may include both electrical wires as well as optical fibers. In embodiments, the magnetic element 115 may extend beyond the face 112 of the plug body 111. However, in other embodiments, the magnetic element 115 may be embedded in the face 112 of the plug body or recessed inwardly from the face 112 into the plug body. The magnetic element may be made from, or coated with, a magnet (either permanent or electromagnetic) or ferromagnetic material.

In embodiments, the receptacle 120 has a body 122 embedded in the housing 121 of the second electronic device 140. The body 122 may have a face 123, a plurality of contacts 124, and a magnetic element 125. As shown in the embodiment of FIG. 1, the contacts 124 may be electrically and/or optically connected to the internal electronics 141 by wires 126 or the like. As used herein, "wires" may include both electrical wires as well as optical fibers. In some embodiments, the face 123 of the receptacle body 122 may be made from one or more magnets (either permanent or electromagnetic) thereby comprising the magnetic element 125. In other embodiments, the face 123 of the receptacle body 122 may be made from, or coated with, ferromagnetic material, thereby comprising the magnetic element 125.

To make the connection between the first and second electronic devices 130 and 140, the face 112 of the plug 110 may be positioned against the face 123 of the receptacle 120. The contacts 114 on the plug 110 may electrically and/or optically engage the contacts 124 on the receptacle 120. This electrical and/or optical engagement between the contacts 114 and 124 may comprise a physical, direct contact, wireless engagement, or some other electrical and/or optical coupling. Thus, the wires 116 connected to the first device 130 may be electrically and/or optically connected to the wires 126 connecting to the internal electronics 141 of the second device 140.

To maintain the connection, the attractive force between the magnetic elements 115 and 125 holds the plug 110 to the receptacle 120. In embodiments, both magnetic elements 115 and 125 may be magnets (either permanent or electromagnetic) arranged to attract magnetically to one another. In embodiments, the polarity of the magnetic element 115 in the plug 110 and the polarity of the magnetic element 125 in the receptacle may be configured and/or oriented such that the plug and the receptacle may only mate in a predetermined relationship or orientation. In other embodiments, either magnetic element 115 or 125 may be a magnet (either permanent or electromagnetic) while the other magnetic element may be a ferromagnetic material such as steel or the like. The permanent magnet used for the magnetic elements may be a permanent rare earth magnet, which have a high flux density compared to their size. When the plug 110 and receptacle 120 are brought into proximity, the attractive force between the magnetic elements 115 and 125 maintains the contacts 114 and 124 in a communicative relationship and/or mating relationship.

The magnetic attraction or force of the plug 110 coupled to the receptacle 120 may be configured for a particular implementation as desired. For embodiments of the magnetic connector 100 used for a power adapter, the magnetic field produced by the magnetic attraction between the elements 115 and 125 may be small enough not to interfere with the supply of power through the electrical contacts 114 and 124. Because magnetic fields of the elements 115 and 125 may interfere with the internal electronics 141 and other components of the electronic device 140, the receptacle 120 may be positioned on the housing 121 at a location away from various components. For example, the receptacle 120 may be positioned away from disk drives, USB ports, internal busses, etc. of a laptop computer. Alternatively, the elements 115 and 125 may be shielded from various components of the electronic device, or a flux bar may be used to direct any magnetic flux of the elements 115 and 125 away from various components.

The plug 110 and the receptacle 120 may enclose one or more opto-electrical circuits, one or more electro-optical circuits, or any combination of opto-electrical circuits and electro-optical circuits depending on how many channels are desired as well as the desired directionality (e.g., uni-directional or bi-directional).

In embodiments plug 110 and the receptacle 120 may be configured to be utilized in conjunction with a high-speed data transmission protocol also requiring transmission of low-speed data, such as low-speed telemetry data or low-speed control data. As an example, the plug 110 may be configured as a Thunderbolt™ active optical cable assembly configured to optically couple electronic devices in accordance with the Thunderbolt™ interface developed by Intel® Corp. of Santa Clara, Calif. It should be understood that the embodiments described herein may be used with other protocols and are not limited to Thunderbolt™ applications.

The current Thunderbolt™ interface allows for high-speed data transfer up to 10 Gb/s. The Thunderbolt™ interface also requires a 1 Mb/s communication channel to allow both sides of the active optical cable assembly 100 to agree on which of the two high-speed channels are in use, or to manage power-down behavior in suspend modes. As stated above, the methods and circuits described herein allow for the low-speed data (e.g., the low-speed 1 Mb/s control data) to be transmitted simultaneously with the high-speed data (e.g., the up to 10 Gb/s data provided by the Thunderbolt™ interface) without the need for additional optical fibers, electrical conductors, shielding or complicated encoding and decoding circuitry.

Figure 2:
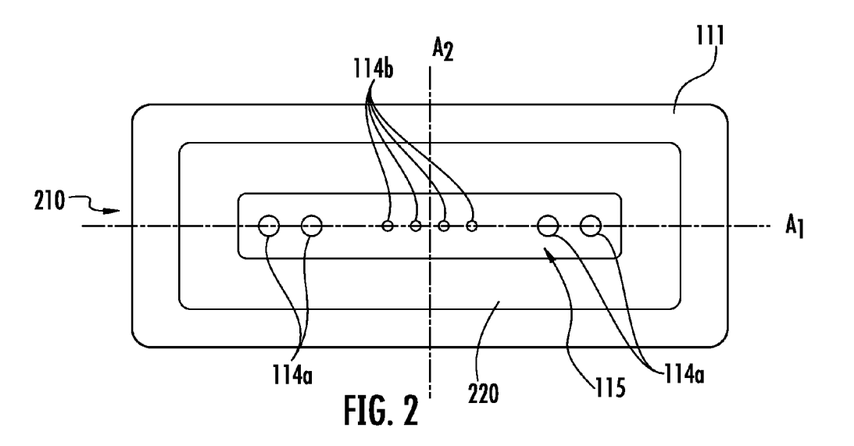
FIG. 2 schematically depicts a front view of a plug according to one or more embodiments described and illustrated herein.
Figure 3:
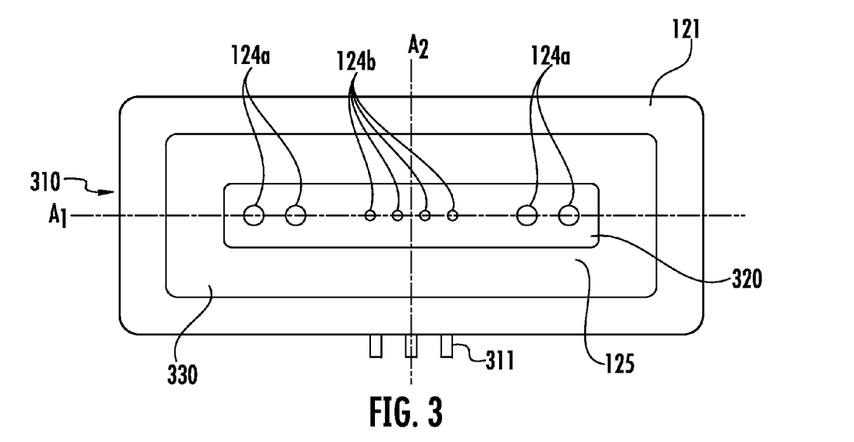
FIG. 3 schematically depicts a front view of a receptacle according to one or more embodiments described and illustrated herein.

Referring to FIGS. 2 and 3, embodiments of a plug 210 and a receptacle 310 of the magnetic connection are illustrated, respectively. As shown in the embodiment depicted in FIG. 2 the plug 210 includes a housing 111, a plurality of contacts 114 (which may include electrical contacts, optical contacts, optical fibers, electrical wires, one side of an electrical coupling, one side of an optical coupling, and/or other mechanisms for connecting power and/or optical lines) a raised magnetic element 115, and a recess 220. The housing 111 may be made of any suitable non-conductive material and may have an oblong shape with two axes of symmetry A1 and A2. The housing 111 encases internal wires (not shown, but similar to wires 116 shown in FIG. 1) of a cable (not shown, but similar to the cable 113 shown in FIG. 1), which connect the contacts 114 to a first device (not shown, but similar to first device 130 shown in FIG. 1), such as a transformer and/or data transmitter, for example. In embodiments, the magnetic element 115 may be positioned on a distal end of the housing 111, and the magnetic element 115 surrounds the recess 220.

In the embodiment shown in FIG. 2, the plurality of contacts 114 comprises fiber-optic contacts 114a that may be used to transfer and/or receive light to and/or from the receptacle 310 shown in FIG. 3. As also shown in FIG. 2, the plurality of contacts 114 may comprise a number of electrical contacts 114b positioned between the fiber-optic contacts 114a. These electrical contacts 114b may be used to convey power from the plug 210 to the receptacle 310 (FIG. 3). In other embodiments, contacts 114b and one or more fiber-optic contacts 114a may have various configurations, and this disclosure is not limited to the configuration shown in FIGS. 2 and 3. Two of these contacts 114b may be used to provide a positive power supply, while one or two contacts 114b may be used for a ground. The contacts 114b and fiber-optic contacts 114a may be located in a recess 220, which may be surrounded by a raised magnetic element 115. The housing 111 may protect the raised magnetic element 115. It is understood that in other embodiments, the plurality of contacts 114 may comprise only electrical contacts or only fiber-optic contacts. It should also be understood that the plug 210 may include only a singular electrical contact or only a singular optical contact.

As shown in embodiments depicted in FIG. 3, the receptacle 310 has a body 121, a plurality of contacts 124 (which may include electrical contacts 124b, optical contacts 124a, optical fibers, electrical wires, one side of an electrical coupling, one side of an optical coupling, and/or other mechanisms for connecting power and/or optical lines), and a magnetic element 125. The body 121 may have an oblong shape with two axes of symmetry A1 and A2 and may be made of any suitable non-conductive material. In embodiments, the receptacle 310 has pins 311 for connecting the contacts 124 to internal electronics of the device. In embodiments, the plurality of contacts 124 may comprise fiber-optic contacts 124a that may be used to accept and/or transfer light transferred and/or delivered over the fiber-optic contacts 114a in the plug. As also shown in FIG. 3, the plurality of contacts 124 may comprise electrical contacts 124b that may be used to convey power from the contacts 114b in the plug. In embodiments, the contacts 124 may be substantially flat plates electrically connected to the pins 311. It is understood that in other embodiments, the plurality of contacts 124 may comprise only electrical contacts or only fiber-optic contacts. It should also be understood that the receptacle 310 may include only a singular electrical contact or only a singular optical contact.

The plug 210 inserts into the receptacle 310. The receptacle 310 includes a number of contacts 124b and fiber-optic contacts 124a that corresponds in number to the number of plug contacts 114b and fiber-optic contacts 114a, respectively. The contacts 124b and fiber-optic contacts 124a may be on a raised guide 320. A recess 330 may surround the raised guide 320. The recess may be located in the housing 121, which may be a separate entity or may be a portion of a device such as a laptop computer, tablet computer, a cellular phone, a display, or handheld electronic device.

In embodiments, when the plug 210 is mated with the receptacle 310, the raised guide 320 fits into the recess 220. Similarly, the raised magnetic element 115 fits into the recess 330. This arrangement provides alignment between the plug 210 and receptacle 310. Also, the plug 210 may be easily demated and/or separated from the receptacle 310 when a cable connected to the plug 210 is pulled away from the receptacle 310. When the plug 210 is coupled with the receptacle 310, the magnetic element 115 of the plug 210 positions against the magnetic element 125 inside of the recess 330 of the receptacle 310. Thus, the magnetic engagement between the magnetic element 115 and the magnetic element 125 holds the plug 210 to the receptacle 310, i.e., holds the plug 210 connected to, mated to, or with the receptacle 310. The magnetic connection between the plug 210 and the receptacle 310 may be of a strength that allows the plug 210 to demate from the receptacle 310 when a force (e.g., which can be a predetermined force) is applied to the cable 113. Further, there may be enough clearance or give between the raised magnetic element 115 and the recess 330 that upon the application of force to the cable 113, the plug 210 may demate from the receptacle 310 without causing damage to either the plug 210 or the receptacle 310. A side effect of the clearance or give between the raised magnetic element 115 and the recess 330 may be that the alignment of contacts 114 in the plug 210 and the contacts 124 in the receptacle 310 may become unaligned when a small force is applied to the plug 210. The misalignment between the fiber-optic contacts 114a and 124a may cause poor, or loss of, data transfer.

Figure 4:
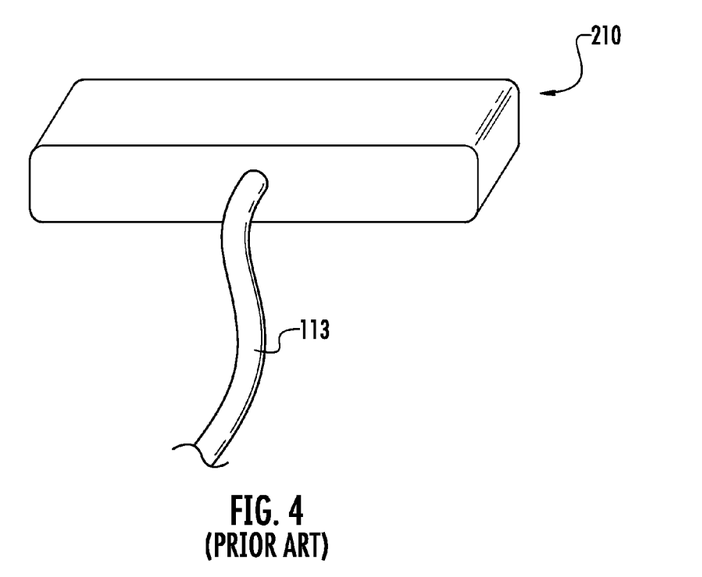
FIG. 4 schematically depicts a back view of a conventional plug.

According to embodiments, one way to address the above misalignment due to external forces is to shorten a moment arm about the axis that is likely to cause the misalignment of the contacts 114 and 124 in the plug 210 and the receptacle 310, respectively. Referring to the embodiment depicted in FIG. 4, because the plug 210 is longer in the x-direction and because the cord 113 is connected to the plug 210 near the center of the plug 210 in the x-center of the plug 210 in the x-direction, the plug 210 is less likely to receive a misalignment force in the x-direction than in the y-direction. For example, a force applied to the cord 113 in the x-direction will bend the cord 113 without causing much movement of the plug 210 in the x-direction. However, because the dimension of the plug 210 in the y-direction is relatively small, and the cord 113 is connected to the plug 210 at an end portion of the plug 210 in the y-direction, a force applied to the cord 113 in the y-direction may cause the plug 210 to move up or down in the y-direction causing misalignment of the fiber-optic contacts (e.g., contacts 114a and 124a shown in FIGS. 2 and 3). Stated another way, the forces in the y-direction cause issues due to the short height of the connector in the y-direction. It should be understood that the dimensions and alignments shown in FIG. 4 are illustrative only and many other dimensions and alignments may be used in accordance with embodiments of this disclosure.

Accordingly, embodiments disclosed herein provide a mechanism for reducing the moment arm about an axis that is likely to cause misalignment. Any suitable configuration may be used to reduce the moment arm about the axis that is likely to cause misalignment, and specific, non-limiting embodiments of such mechanisms are described in detail below with reference to the figures.

Figure 5:
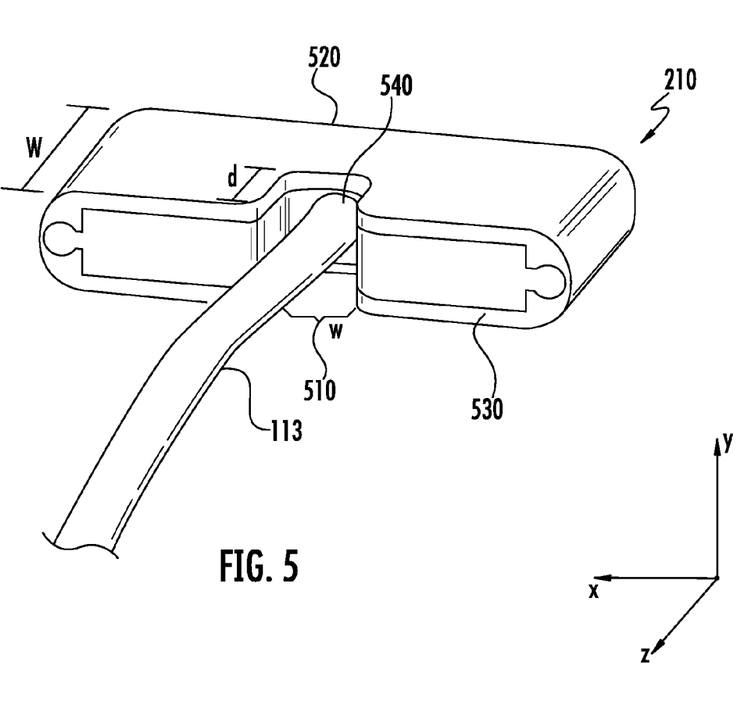
FIG. 5 schematically depicts a back view of a plug according to one or more embodiments described and illustrated herein.

Referring now to the embodiment depicted in FIG. 5, the moment arm for a force applied to the cord 113 in the y-direction may be reduced by moving the connection of the cord 113 to the plug 210 from a back surface 530 of the plug 210 toward a front surface 520 of the plug 210. In embodiments, the distance (d) from the back surface 530 of the plug 210 to an intersection 540 of the cord and the plug may be restricted by the internal components of the plug 210, which are discussed in more detail below. However, in embodiments, the distance (d) from the back surface 530 of the plug 210 to the intersection 540 of the cord and the plug may be from greater than or equal to about 20% of the overall width (W) of the plug 210 to less than or equal to about 80% of the overall width (W) of the plug 210, or even from greater than or equal to about 30% of the overall width (W) of the plug 210 to less than or equal to about 70% of the overall width (W) of the plug 210. In other embodiments, the distance (d) from the back surface 530 of the plug 210 to the intersection 540 of the cord and the plug may be from greater than or equal to about 40% of the overall width (W) of the plug 210 to less than or equal to about 60% of the overall width (W) of the plug 210, or even about 50% of the overall width (W) of the plug 210.

The displacement of the intersection 540 between the cord and the plug toward the front surface 520 of the plug 210 forms a recess 510 in the plug 210. In embodiments, the width of the recess may be sufficient to allow play of the cord 113 in the x-direction. In embodiments, the width (w) of the recess 510 may be from greater than or equal to about 1.5 times larger than the diameter of the cord 113 to less than or equal to about 3.0 times larger than the diameter of the cord 113, or even about 2.0 times larger than the diameter of the cord 113. Allowing such play in the x-direction will reduce a moment arm if a force is applied to the cord 113 in the x-direction. It should be understood that the geometry of the recess in FIG. 5 is illustrative only and that many other geometries may be used in accordance with embodiments disclosed herein. It should be understood that other configurations that displace the intersection 540 between the cord and the plug from the back surface 530 of the plug toward the front surface 520 of the plug are included in this disclosure.

Figure 6:
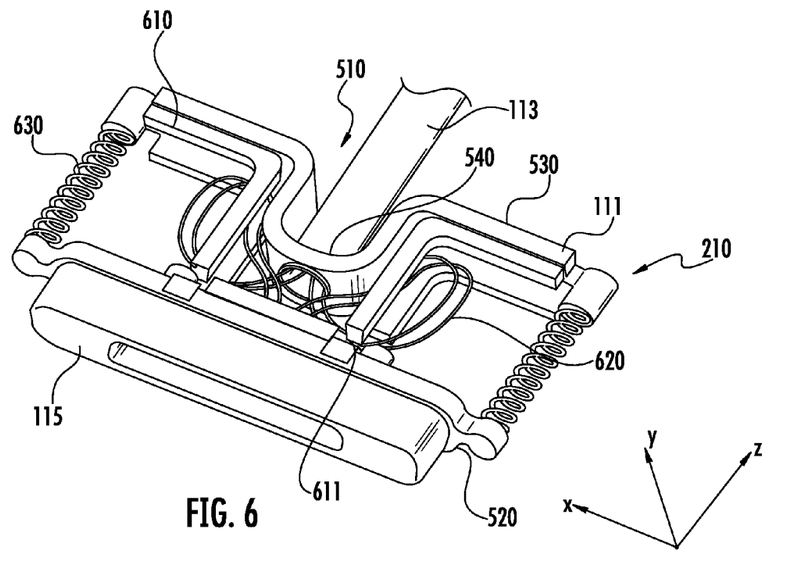
FIG. 6 schematically depicts internal components of a plug according to one or more embodiments described and illustrated herein.

Referring now to embodiments depicted in FIG. 6, the internal components of the plug 210 are shown. In embodiments, the plug 210 may include a support frame 610, wires 620, and springs 630. The wires 620 extend through the cable 113 and allow power and/or data to be transferred from a device (not shown) to the plug 210. The wires 620 connect to the contacts (e.g., fiber-optic contacts 114a and electrical contacts 114b shown in FIG. 2). As shown in the embodiment of FIG. 6, the wires may be looped so that they do not connect with the contacts (e.g., fiber-optic contacts 114a or contacts 114b shown in FIG. 2) immediately after they exit the cable 113 (e.g., the wires have slack to inhibit forces from pulling the wires from contacts). This allows the intersection 540 between the cable and the plug to be displaced toward the front surface of the plug 520 and still maintain their connection with the fiber-optic contacts and electrical contacts (e.g., contacts fiber-optic contacts 114a and electrical contacts 114b of FIG. 2) when a force is applied to the plug 210. Any suitable wires may be used.

In embodiments, the springs 630 may be placed at either end of the plug 210 in the x-direction and allow the plug 210 to flex when force is applied to the raised magnetic element 115. The springs 630 also allow the plug 210 to flex when it is subjected to a force and/or demated from the receptacle, thereby reducing the amount of damage that may occur during such an occurrence. Any suitable springs may be used. The support frame 610 prevents the front surface 520 and/or the back surface 530 of the plug 210 from being displaced beyond a certain distance when force is applied in the z-direction. For example, if a force is applied in the negative z-direction against the back surface 530 or the cord 113 of the plug 210 when the plug 210 is mated with the receptacle 310, the receptacle will apply an equal and opposite force against the front surface 520 of the plug 210 causing the front surface 520 to displace toward the back surface 530. If the force is strong enough, it may cause the front surface 520 to displace toward the back surface 530 until the front surface 520 contacts the support frame 610, thus protecting the wires 620. In embodiments, when no force is applied in the z-direction, a gap 611 exists between the support frame 610 and the front surface 520. However, when a force is applied to the plug in the negative z-direction, the front surface 520 may be displaced toward the back surface 530 and closes the gap 611 between the front surface 520 of the plug 210 and the support frame 610, thereby contacting the support frame. As such, the support frame 610 acts as a protective stop. In embodiments, the springs 630 may be configured to provide resistance to the front surface 520 of the plug 210 when a force is applied in the negative z-direction as described above so that the gap 611 is not closed too quickly, thereby reducing damage to the support frame 610, the front surface 520, and the wires 620. Additionally, when a force is applied to the plug 210 in the positive z-direction, the springs 630 may initially expand in resistance to a magnetic force between the plug 210 and the receptacle 310, allowing the back surface 530 to be temporarily displaced a distance from the front surface 520. If the force applied in the positive z-direction is insufficient to break the magnetic force between the plug 210 and the receptacle 310, the plug 210 and the receptacle 310 will remain mated, and the springs 630 will contract when the force applied to the plug subsides. However, when the force applied to the plug in the positive z-direction is strong enough to break the magnetic force between the plug 210 and the receptacle 310, the plug 210 and the receptacle 310 will be demated, and the springs 630 will contract. In embodiments, the spring strength may be selected to be greater than or less than the magnetic force between the plug 210 and the receptacle 310.

Alternatively, the magnetic force between the plug 210 and the receptacle 310 can be selected to be greater than or less than the spring strength of the springs of the plug 210.

Figure 7:
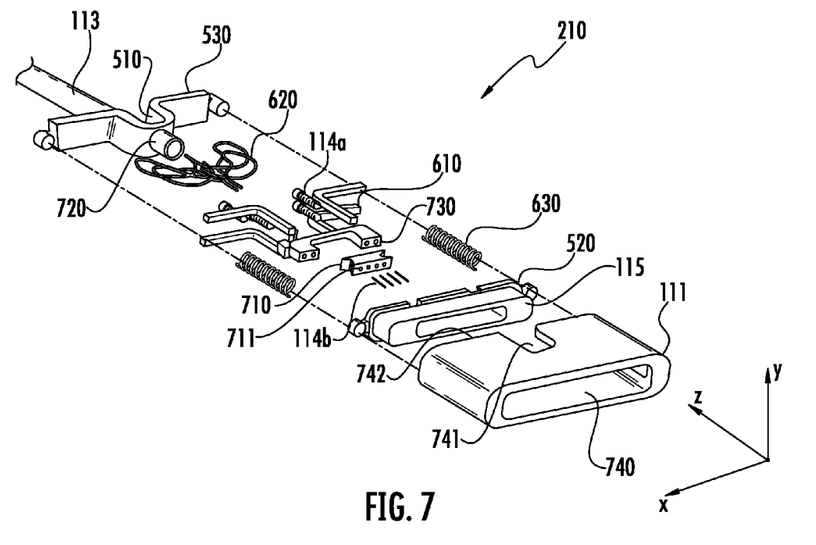
FIG. 7 schematically depicts an exploded view of internal components of a plug according to one or more embodiments described and illustrated herein.

FIG. 7 is an exploded view of the internal components of the plug 210 according to embodiments. FIG. 7 more clearly shows the positioning and relationships between the internal components of the plug 210. The cable 113 may be connected to a back surface 530 of the plug 210 by being inserted into an aperture 720 in the back surface 530 of the plug. In embodiments, the back surface 530 of the plug may include a recess 510 that may be formed by displacing a portion of the back surface 530 toward the front surface 520. As discussed above herein, this recess may reduce the moment arm of a force applied to the cable.

Wires 620 may be configured to connect fiber-optic contacts 114a and contacts 114b to a device (not shown) via the cable 113. The configuration of the wires 620 may be such that excess wire is present allowing the wires to maintain contact with the fiber-optic contacts 114a and the contacts 114b when a force is applied to the plug 210, which may cause the distance between the front surface 520 and the back surface 530 of the plug 210 to expand temporarily. A looped configuration is shown in FIG. 7; however, any wire configuration that provides excess wire may be used. The fiber-optic contacts 114a may be inserted into apertures 730 in the support frame 610 thereby fixing the position of the fiber-optic contacts 114a in the plug 210. The fiber-optic contacts may be friction fitted into the apertures 730 and/or an adhesive may be used to affix the fiber-optic contacts to the apertures 730. Any suitable adhesive that does not impede data transfer may be used. The support frame 610 protects various internal components of the plug, such as, for example, the wires 620 and the fiber-optic contacts 114a, when a force is applied to the plug 210, particularly a force applied in the z-direction. The support frame 610 also secures the placement of the fiber-optic contacts, thereby protecting the fiber-optic contacts from damage.

In embodiments, a contact support 710 may be used to support contacts 114b. The contact support 710 may include apertures 711 through which the contacts 114b may be inserted. The contacts 114b may be friction fitted into the apertures 711 and/or an adhesive may be used to secure the contacts 114b in the apertures. Any suitable adhesive that does not impede power transfer may be used. The contact support 710 may be formed from any suitable material; however, in embodiments the contact support 710 may be made from an electrical or thermal insulating material. The contact support 710 may be connected to the support frame 610, such as, in embodiments, by molding the contact support 710 and the support frame 610 as a unitary structure. In embodiments, the contact support 710 may be adhered to the support frame 610 by an adhesive. Any suitable adhesive may be used.

The springs 630 may span between the back surface 530 of the plug 210 and the front surface 520 of the plug 210. The springs 630 allow the front surface 520 to be controllably displaced toward or away from the back surface 530 when a force is applied in the z-direction, as discussed herein above. A magnetic element 115 may be present on the front surface 520 of the plug 210. The magnetic element may be comprised of a magnetic material (either permanent or electromagnetic) or it may be comprised of a ferromagnetic material. The magnetic element 115 may be adhered to the front surface 520 by and adhesive, such as, for example, solder or welding, or the magnetic element 115 and the front surface 520 may be formed as a unitary structure.

A housing 111 may encase the internal components, thereby protecting them from environmental damage, such as dust, moisture, and debris. The housing may include an aperture 740 configured to allow the magnetic element 115 to extend through the housing 111 and be exposed. The housing 111 may also include a recess 741 with dimensions configured to correspond with the recess 510 in the back surface 530 of the plug 210. The housing 111 may also include an aperture 742 with dimensions coinciding with the back surface 530 that allows the back surface 530 to be connected to the housing 111. The housing 111 and the back surface 530 may be connected by a friction fitting of the back surface 530 into the aperture 742 and/or an adhesive may be used to secure the back surface 530 into the housing 111. Any suitable adhesive may be used.

Figure 8:
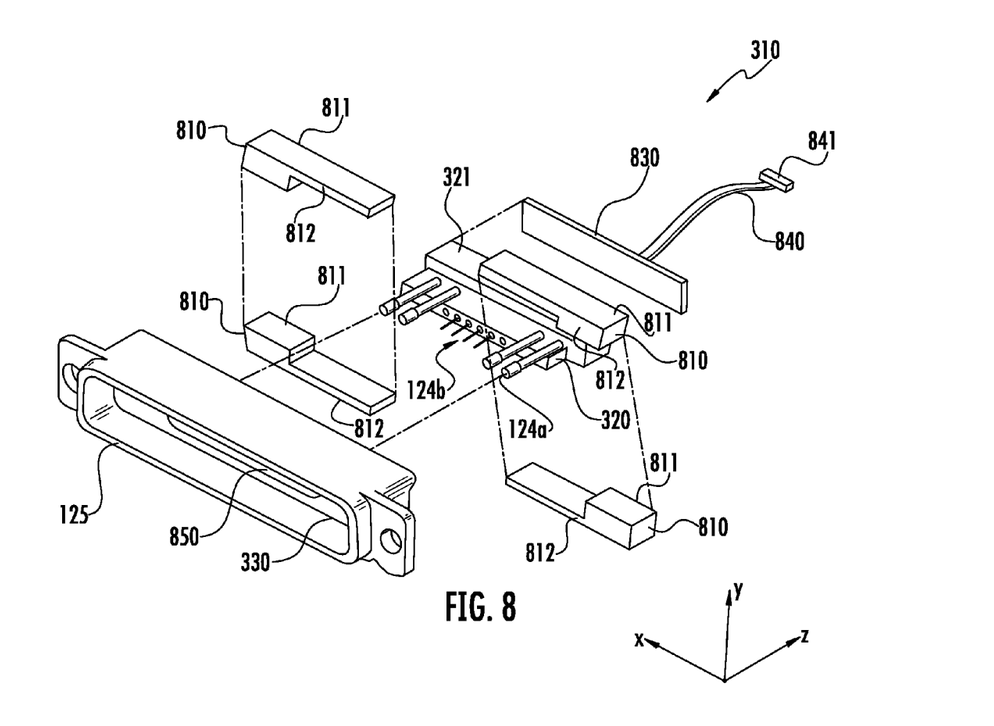
FIG. 8 schematically depicts an exploded view of internal components of a receptacle according to one or more embodiments described and illustrated herein.

Referring now to embodiments shown in FIG. 8, an exploded view of the receptacle 310 is shown. The receptacle 310 may include a magnetic element 125 having a recess 330 and an aperture 850. The recess 330 may be configured to mate with the magnetic element 115 and the housing 111 of the plug 210. The aperture 850 may be configured so that the raised guide 320 may be inserted through the aperture. The raised guide 320 may be secured in the aperture 850 by any suitable method, such as friction fitting and/or using an adhesive. Any suitable adhesive may be used. The raised guide 320 may include a back portion 321 that has larger dimensions than the aperture 850, thereby ensuring that the raised guide does not completely go through the aperture 850. The fiber-optic contacts 124a and contacts 124b may be secured into the raised guide 320 by any suitable method, such as friction fitting and/or using an adhesive. Any suitable adhesive may be used. The fiber-optic contacts 124a and contacts 124b may be contacted with a backplate 830. The backplate may be any structure capable of transmitting power and/or data from the fiber-optic contacts 124a and the contacts 124b to a cord 840. In embodiments, the backplate 830 may be a printed circuit board that directs power transmitted through the contacts 124b and data transmitted through the fiber-optic contacts 124a to a cable 840. The cable 840 may include a connector 841 that connects the receptacle to circuits in an electronic device (not shown).

In embodiments, the receptacle 310 may also include one or more magnets that fully or partially surround the raised guide 320. As shown in FIG. 8, four magnets 810 may be configured in quadrants to fully surround the raised guide 320. The front surfaces 812 of the magnets 810 may contact the magnetic element 125, and the back surfaces 811 of the magnets 810 may be configured to lie flush with a back surface of the back portion 321 of the raised guide. The magnets 810 thereby magnetize the magnetic element 125 allowing it to be attracted to the magnetic element 115 of the plug 210. It should be understood that the configuration of the components shown in FIG. 8 are illustrative only, and many other configurations may be included in the scope of this disclosure.

Figure 9A:
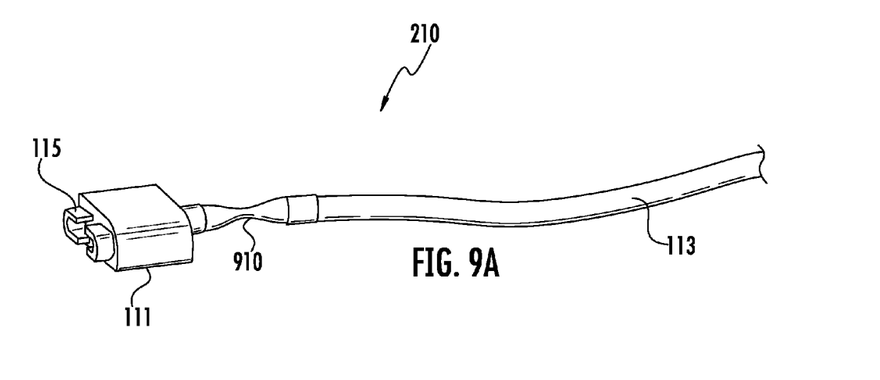
FIGS. 9A and 9B schematically depict a side view of a plug according to one or more embodiments described and illustrated herein.
Figure 9B:
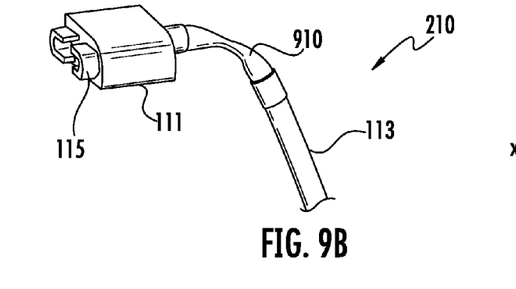

Referring now to FIGS. 9A and 9B, which depict another embodiment for reducing the moment arm when a force is applied to the cable, articulation around an axis where the moment arm is applied is provided. Although articulation could be provided by mechanical mechanisms, the embodiments depicted in FIGS. 9A and 9B use of an overmolded section 910 between the cable 113 and the housing 111. The overmolded section 910 may be formed from any suitable material that may be more flexible than the cable 113 and will, therefore, flex when a force is applied to the cable, which will reduce the moment arm on the plug 210 when a force is applied. In embodiments, the overmolded section 910 may be made from a polymer or an elastomer that may be more flexible than the cord 113. In embodiments, the overmolded section 910 may be at least about 1.5 times more flexible than the cord 113, or even at least about 2.0 times more flexible than the cord. In other embodiments, the overmolded section 910 may be at least about 2.5 times more flexible than the cord 113, or even at least about 3.0 times more flexible than the cord. In embodiments, the overmolded section may bend at forces from greater than or equal to about 0.25 pounds to less than or equal to about 10.0 pounds, such as from greater than or equal to about 0.40 pounds to less than or equal to about 9.5 pounds. In some embodiments, the overmolded section may bend at forces from greater than or equal to about 0.50 pounds to less than or equal to about 9.0 pounds, such as from greater than or equal to about 0.75 pounds to less than or equal to about 8.5 pounds. In yet other embodiments, the overmolded section may bend at forces from greater than or equal to about 1.0 pound to less than or equal to about 8.0 pounds, such as from greater than or equal to about 1.25 pounds to less than or equal to about 7.5 pounds. In embodiments, the overmolded section may comprise any material that bends at a suitable force, such as, for example, urethanes, silicones, and thermoplastics. In some embodiments, the overmolded section may comprise SANTOPRENE (manufactured by Exxon Mobil), KRATON (manufactured by Kraton polymers), ACCUTECH (manufactured by ACLO), GEOLAST (manufactured by Exxon Mobil), TREFSIN (manufactured by Exxon Mobil), VISTAFLEX (manufactured by Exxon Mobil), VYRAM (manufactured by Exxon Mobil), CHRONOFLEX (manufactured by AdvanSource Biomaterials), CHRONOPRENE (manufactured by AdvanSource Biomaterials), CHRONOTHANE (manufactured by AdvanSource Biomaterials), HYDROMED (manufactured by AdvanSource Biomaterials), HYDROSLIP (manufactured by AdvanSource Biomaterials), HYDROTHANE (manufactured by AdvanSource Biomaterials), ISODAMP (manufactured by Aearo Technologies), VERADAMP (manufactured by Aearo Technologies), ALPHASEAL (manufactured by Alpha Gary Corporation), EVOPRENE (manufactured by Alpha Gary Corporation), GARAFLEX (manufactured by Alpha Gary Corporation), SMOKEGAURD (manufactured by Alpha Gary Corporation), ALCRYN (manufactured by Advanced Polymer Alloys).

FIG. 9A depicts the plug 210 according to embodiments where there is no force applied to the cord 113 and it extends substantially straight out from the housing 111. As can be seen in FIG. 9A embodiments of the overmolded section 910 may have a variable diameter, such as an hourglass shape, where the minimum diameter of the overmolded section 910 is approximately in the middle of the overmolded section 910 in the longitudinal direction of the cord 113. In embodiments, the minimum diameter of the overmolded section 910 may be positioned in the middle of the overmolded section 910 plus or minus 10% of the length of the overmolded section 910, or even positioned in the middle of the overmolded section 910 plus or minus 15% of the length of the overmolded section. In some embodiments, the minimum diameter of the overmolded section 910 may be positioned in the middle of the overmolded section 910 plus or minus 20% of the length of the overmolded section 910, or even positioned in the middle of the overmolded section 910 plus or minus 25% of the length of the overmolded section. FIG. 9B depicts an embodiment of the plug 210 when force is applied to the cord 113 in the y-direction. As shown in the embodiments depicted in FIG. 9B, the overmolded section 910 flexes where its diameter is at a minimum, thereby reducing, minimizing, and/or eliminating the moment arm applied to the housing 111. The concepts of the overmolded section may be used with or without the concepts of the housing with the recessed surface.

Figure 10A:
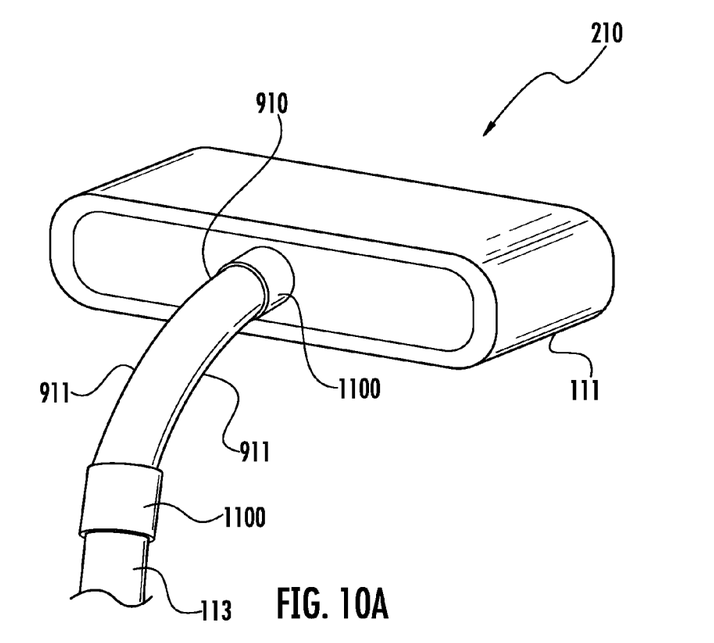
FIG. 10A schematically depicts a profile view of a plug according to one or more embodiments described and illustrated herein.
Figure 10B:
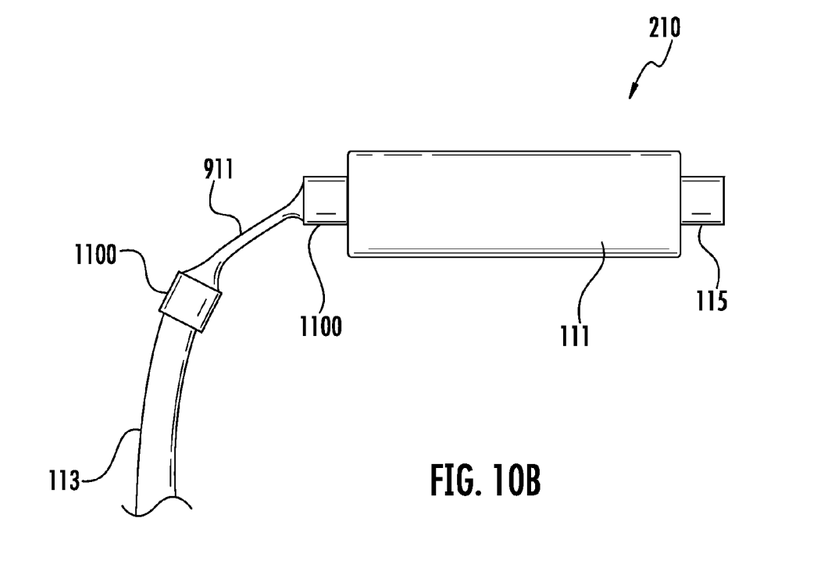
FIG. 10B schematically depicts a side view of a plug according to one or more embodiments described and illustrated herein.

Referring now to FIG. 10A, which depicts an embodiment where the overmolded section 910 has a flat geometry. In such an embodiment, the elements inside the overmolded section, such as, for example, wires, may be placed between sheets of polymers and then heat sealed. In embodiments, any suitable polymer may be used as the overmolded section, such as, for example thermoplastics. In some embodiments, the overmolded section may be made from SANTOPRENE or KRATON This configuration may provide good centering and placement of the elements inside the overmolded section. Strengthened edges 911 may be used on the overmolded section 910 to prevent the overmolded section 910 from splitting upon repeated bending. FIG. 10B depicts a side view of the plug shown in FIG. 10A.

Figure 11:
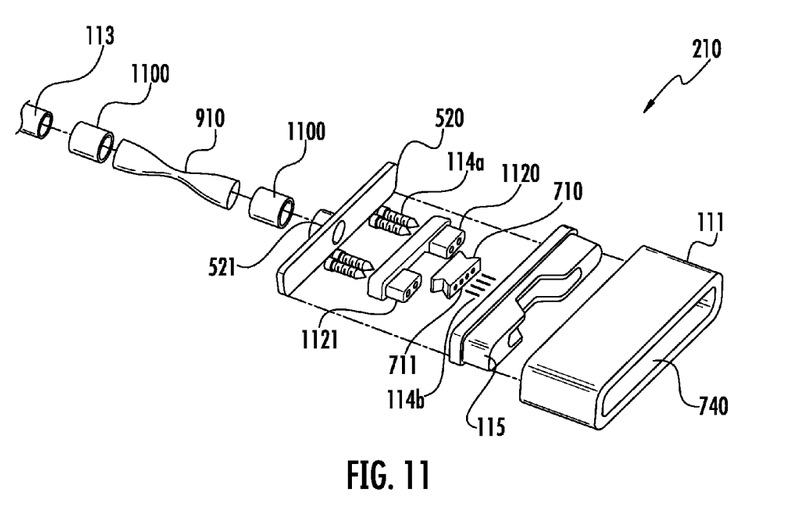
FIG. 11 schematically depicts an exploded view of internal components of a plug according to one or more embodiments described and illustrated herein.

Referring now to FIG. 11, which depicts an exploded view of a plug 210 according to embodiments. The plug 210 may include a cable 113 that guides wires (not shown) from a device (not shown) to the plug 210. The cable 113 may be connected to the overmolded section 910 by a connecting ring 1100. The connecting ring 1100 may connected the cable 113 and the overmolded section 910 by any suitable method such as crimping one or more of the cable 113 and/or the overmolded section, or by an adhesive. Likewise, the overmolded section 910 may be connected to a back surface 520 of the plug 210 via a connecting ring 1100. The overmolded section 910 may be made of any suitable material, such as, for example, the materials discussed above. The back surface 530 of the plug 210 may include a cylindrical portion 521 that may be configured to attach the connecting ring to the back surface 530 of the plug 210, such as by crimping or by an adhesive.

The fiber-optic contacts 114a may be inserted into apertures 1121 in a support 1120 thereby fixing the position of the fiber-optic contacts 114a in the plug 210. The fiber-optic contacts may be friction fitted into the apertures 1121 and/or an adhesive may be used to affix the fiber-optic contacts to the apertures. Any suitable adhesive that does not impede data transfer may be used. The support 1120 also secures the placement of the fiber-optic contacts, thereby protecting the fiber-optic contacts from damage when a force is applied to the plug 210.

In embodiments, a contact support 710 may be used to support contacts 114b. The contact support 710 may include apertures 711 through which the contacts 114b may be inserted. The contacts 114b may be friction fitted into the apertures 711 and/or an adhesive may be used to secure the contacts 114b in the apertures. Any suitable adhesive that does not impede power transfer may be used. The contact support 710 may be formed from any suitable material; however, in embodiments the contact support 710 may be made from an electrically insulating material. The contact support 710 may be connected to the support frame 610, such as, in embodiments, by molding the contact support 710 and the support 1120 as a unitary structure. In embodiments, the contact support 710 may be adhered to the support frame 1120 by an adhesive. Any suitable adhesive may be used.

A housing 111 may encase the internal components, thereby protecting them from environmental damage, such as dust, moisture, and debris. The housing 111 may include an aperture 740 configured to allow the magnetic element 115 to extend through the housing 111 and be exposed. The housing 111 may also include an aperture (not shown) with dimensions coinciding with the back surface 530 that allows the back surface 530 to be connected to the housing 111. The housing 111 and the back surface 530 may be connected by a friction fitting of the back surface 530 into the aperture and/or an adhesive may be used to secure the back surface 530 into the housing 111.

Figure 12A:
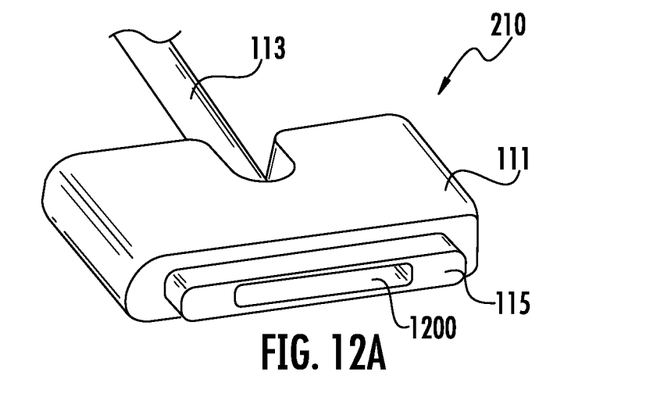
FIGS. 12A and 12B schematically depict a perspective view of a plug according to one or more embodiments described and illustrated herein.
Figure 12B:
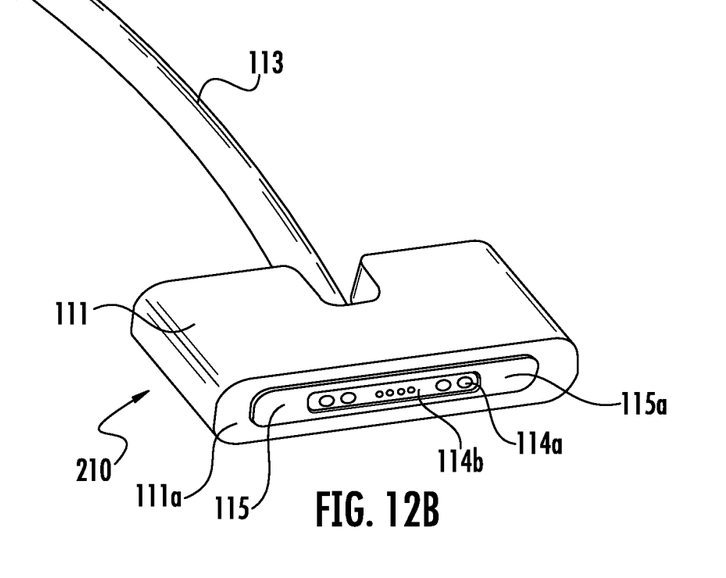

In embodiments, the plug 210 may include features that allow easier access to the fiber-optic contacts 114a and the contacts 114b so that the fiber-optic contacts 114a and the contacts 114b may be serviced, such as cleaned. Referring now to FIGS. 12A and 12B, embodiments are shown where the magnetic element 115 is retractable. FIG. 12A depicts a plug 210 according to embodiments where the magnetic element 115 on the plug 210 is in an extended position. When the magnetic element 115 is in the extended position, the magnetic element 115 extends outwardly from the housing 111 and over the fiber-optic contacts 114a and the contacts 114b (not shown), thereby limiting access to the fiber-optic contacts 114a and the contacts 114b. An aperture 1200 in the magnetic element 115 allows the fiber-optic contacts 114a and the contacts 114b to mate with fiber-optic contacts 124a and contacts 124b in the receptacle 113 when the plug 210 and the receptacle 310 are mated.

FIG. 12B depicts the plug 210 shown in FIG. 12A, but with the magnetic element 115 in a retracted position. When the magnetic element 115 is in the retracted position, a portion of the magnetic element 115 may be positioned within the housing 111, thereby exposing only the front surface 115a of magnetic element. In this position, the front surface 115a of the magnetic element 115 may be coplanar, or substantially coplanar, with the front surface 111a of the housing 111. This configuration allows easier access to the fiber-optic contacts 114a and the contacts 114b so that they can be serviced, such as cleaned.

In embodiments, the magnetic element 115 may be moved from the extended position to the retracted position by any suitable mechanism. For example, the magnetic element may be locked into either the extended position or the retracted position by a snap fitting. In some embodiments, the magnetic element 115 may be supported in the extended position by springs (such as springs 630 shown in FIG. 6) having a tension sufficient to hold the magnetic element 115 in the extended position. When a force sufficient to overcome the tension of the springs is applied to a front surface 115a of the magnetic element 115 toward the housing 111, the magnetic element is moved to the retracted positions, as shown in FIG. 12B. Accordingly, the tension of the springs may be selected so that the magnetic element 115 does not move from the extended position to the retracted position when an incidental force (such as misalignment of the magnetic element upon attempted mating with the receptacle) is applied to the front surface 115a of the magnetic element 115 toward the housing 111.

Figure 13:
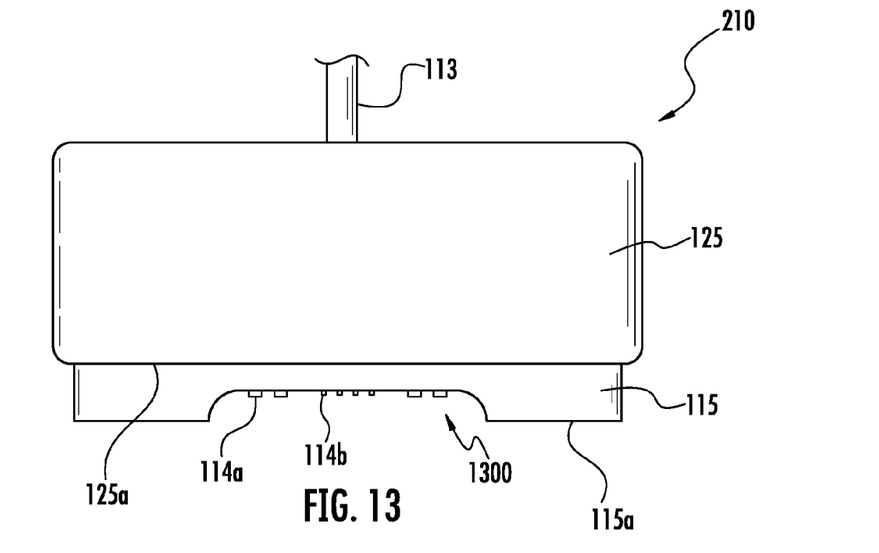
FIG. 13 schematically depicts a top view of a plug according to one or more embodiments described and illustrated herein.
Figure 14:
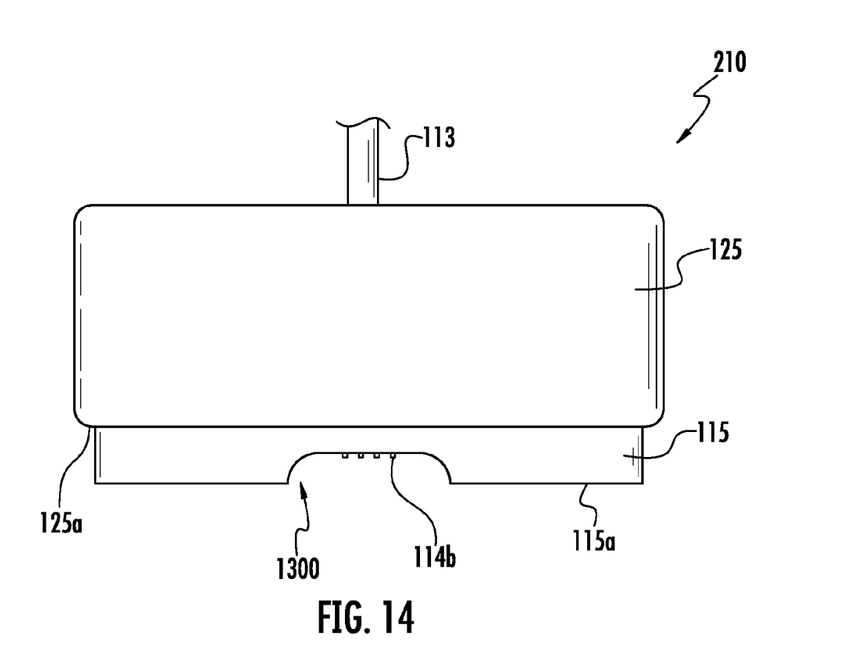
FIG. 14 schematically depicts a top view of a plug according to one or more embodiments described and illustrated herein.

FIG. 13 depicts a top view of plug 210 according to embodiments. The magnetic element 115 may include a recess 1300 where the front surface 115a of the magnetic element 115 may be displaced toward the front surface 111a of the housing 111. The recess 1300 allows easy access to the fiber-optic contacts 114a and the contacts 114b so that they may be serviced, such as cleaned. Although the width of the recess 1300 shown in FIG. 13 is such that all of the fiber-optic contacts 114a and the contacts 114b may be present within the recess 1300, in other embodiments, the recess 1300 may have a width so that only part of the fiber-optic contacts 114a and/or the contacts 114b may be present within the recess. For example, as depicted in FIG. 14, which depicts a top view a plug according to embodiments, only the contacts 114b may be present within the width of the recess 1300, and the fiber-optic contacts may be covered by the magnetic element 115. The dimensions, shape, and configuration of the recess 1300 depicted in FIGS. 13 and 14 are for illustrative purposes only and many other dimensions, shapes, and configurations that allow easy access to the fiber-optic contacts 114a and/or the contacts 114b are included within the scope of this disclosure.

For the purposes of describing and defining the subject matter of the disclosure it is noted that the term "substantially" is utilized herein to represent the inherent degree of uncertainty that may be attributed to any quantitative comparison, value, measurement, or other representation.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A plug for connecting to an electronic device comprising:
   a housing having a first surface, a first aperture in the first surface, and a second surface;
   a magnetic element positioned in the first aperture and having a second aperture;
   at least one contact within the first aperture and the second aperture;
   a cord connected to the second surface of the housing, wherein the second surface of the housing is opposite the first surface of the housing; and
   a recess in the second surface configured so that an intersection between the cord and the second surface is displaced toward the first surface relative to a non-recessed portion of the second surface, wherein the recess is perpendicular to the second surface.

2. The plug of claim 1, wherein the contact is a fiber-optic contact, and
   further comprising at least one electrical contact within the first aperture and the second aperture.

3. The plug of claim 1, wherein a distance from the non-recessed portion of the second surface to the intersection between the cord and the second surface is from greater than or equal to about 20% of the width of the plug to less than or equal to about 80% of the width of the plug.

4. The plug of claim 1, wherein a width of the recess is from greater than or equal to about 1.5 times the diameter of the cord to less than or equal to about 3.0 times the diameter of the cord.

5. The plug of claim 1, wherein the magnetic element is moveable between a first position and a second position, wherein when the magnetic element is in the first position, a distal surface of the magnetic element extends through the first aperture and beyond the first surface of the housing, and wherein when the magnetic element is in the second position, the distal surface of the magnetic element is substantially coplanar with the first surface of the housing.

6. The plug of claim 5, wherein when the magnetic element is in the second position, the first surface of the housing, the distal surface of the magnetic element, and distal surfaces of the at least one contact are substantially coplanar.

7. The plug of claim 1, wherein a distal surface of the magnetic element extends through the first aperture and beyond the first surface of the housing, and the magnetic element comprises a recess where at least a portion of the distal surface of the magnetic element is displaced toward the first surface of the housing.

8. The plug of claim 7, wherein the first surface of the housing and distal surfaces of the at least one contact are substantially coplanar.

9. The plug of claim 1, wherein the recess is configured to reduce a moment arm on the housing when a force is applied to the cord.

10. A connection for connecting one or more electronic devices comprising:
   a plug comprising:
      a housing having a first surface and a first aperture in the first surface,
      a first magnetic element positioned in the first aperture and having a second aperture,
      at least one plug contact within the first aperture and the second aperture,
      a cord connected to a second surface of the housing, wherein the second surface of the housing is opposite the first surface of the housing, and
      a recess in the second surface configured so that an intersection between the cord and the second surface is displaced toward the first surface relative to a non-recessed portion of the second surface, wherein the recess is perpendicular to the second surface; and
   a receptacle comprising:
      a second magnetic element having a recess, wherein the recess comprises a third aperture,
      at least one receptacle contact extending through the third aperture and into the recess,
   wherein the first magnetic element and the second magnetic element are configured to be mated to one another.

11. The connection of claim 10, wherein the at least one plug contact and the at least one receptacle contact are fiber-optic contacts,
   the plug further comprises at least one plug electrical contact within the first aperture and the second aperture of the plug, and
   the receptacle comprises at least one receptacle electrical contact extending through the third aperture and into the recess.

12. The connection of claim 11, wherein the plug and the receptacle have a corresponding number of fiber-optic contacts and a corresponding number of electrical contacts.

13. The connection of claim 12, wherein corresponding fiber-optic contacts of the plug and the receptacle form an optical connection when the plug and the receptacle are mated.

14. The connection of claim 12, wherein corresponding fiber-optic contacts of the plug and the receptacle form an optical connection when the plug and the receptacle are mated, and corresponding electrical contacts of the plug and the receptacle form an electrical connection when the plug and the receptacle are mated.

15. The connection of claim 10, further comprising an overmolded section positioned between the cord and the housing, and
   wherein the overmolded section is more flexible than the cord.

16. The connection of claim 10, wherein the magnetic element is moveable between a first position and a second position, wherein when the magnetic element is in the first position, a distal surface of the magnetic element extends through the first aperture and beyond the first surface of the housing, and wherein when the magnetic element is in the second position, the distal surface of the magnetic element is substantially coplanar with the first surface of the housing.

17. The connection of claim 10, wherein a distal surface of the first magnetic element extends through the first aperture and beyond the first surface of the housing, and the first magnetic element comprises a recess where at least a portion of the distal surface of the first magnetic element is displaced toward the first surface of the housing.

18. The connection of claim 10, wherein the receptacle further comprises one or more magnets, wherein second magnetic element comprises a first surface configured to mate with the plug, and a second surface opposite the first surface, and wherein the magnets contact the second surface of the magnetic element.

19. The connection of claim 10, wherein the recess is configured to reduce a moment arm on the housing when a force is applied to the cord.

20. A plug for connecting to an electronic device comprising:
   a housing having a first surface, a first aperture in the first surface, and a second surface;
   a magnetic element positioned in the first aperture and having a second aperture;
   at least one contact within the first aperture and the second aperture, wherein the contact is a fiber-optic contact;
   at least one electrical contact within the first aperture and the second aperture;
   a cord connected to the second surface of the housing; and
   an overmolded section positioned between the cord and the housing, wherein the overmolded section is more flexible than the cord.

21. The plug of claim 20, wherein the overmolded section bends at forces from greater than or equal to about 0.25 pounds to less than or equal to about 10.0 pounds.

22. The plug of claim 20, wherein the overmolded section has a variable diameter and the minimum diameter of the overmolded section is positioned in the middle of the overmolded section plus or minus 25% of the length of the overmolded section.

23. The plug of claim 20, wherein the overmolded section may be formed from a member selected from the group consisting of elastomers, silicones, thermoplastics, and combinations thereof.

24. The plug of claim 20, wherein the second surface of the housing is opposite the first surface of the housing, and the plug further comprises a recess in the second surface of the housing configured so that an intersection between the cord and the second surface is displaced toward the first surface relative to a non-recessed portion of the second surface.

25. The plug of claim 20, wherein the magnetic element is moveable between a first position and a second position, wherein when the magnetic element is in the first position, a distal surface of the magnetic element extends through the first aperture and beyond the first surface of the housing, and wherein when the magnetic element is in the second position, the distal surface of the magnetic element is substantially coplanar with the first surface of the housing.

26. The plug of claim 20, wherein a distal surface of the magnetic element extends through the first aperture and beyond the first surface of the housing, and the magnetic element comprises a recess where at least a portion of the distal surface of the magnetic element is displaced toward the first surface of the housing.

27. The plug of claim 20, wherein the overmolded section is configured to reduce a moment arm on the housing when a force is applied to the cord.

* * * * *